US008181448B2

(12) United States Patent
    Kwon

(10) Patent No.: US 8,181,448 B2
(45) Date of Patent: May 22, 2012

(54) SYSTEM FOR CONTROLLING UREA INJECTION QUANTITY OF VEHICLE AND METHOD THEREOF

(75) Inventor: Soon Hyung Kwon, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 727 days.

(21) Appl. No.: 12/357,139

(22) Filed: Jan. 21, 2009

(65) Prior Publication Data

US 2010/0031639 A1   Feb. 11, 2010

(30) Foreign Application Priority Data

Aug. 7, 2008 (KR) .................. 10-2008-0077581

(51) Int. Cl.
 *F01N 3/00* (2006.01)
 *F01N 3/10* (2006.01)
(52) U.S. Cl. ............. 60/286; 60/295; 60/301; 60/303
(58) Field of Classification Search .............. 60/274, 60/286, 295, 301, 303
 See application file for complete search history.

(56) References Cited

U.S. PATENT DOCUMENTS

| 5,884,475 | A | * | 3/1999 | Hofmann et al. | ............... | 60/274 |
| 2007/0204677 | A1 | * | 9/2007 | Nishina et al. | ............... | 73/53.01 |
| 2008/0256937 | A1 | * | 10/2008 | Suzuki | ............... | 60/300 |
| 2009/0101656 | A1 | * | 4/2009 | Leonard | ............... | 220/562 |
| 2009/0255232 | A1 | * | 10/2009 | Barcin | ............... | 60/274 |

FOREIGN PATENT DOCUMENTS

WO    WO 2006074833 A1 * 7/2006

OTHER PUBLICATIONS

Fleetguard, "Diesel Exhaust Fluid (DEF) Facts", retrieved Nov. 29, 2010.*

* cited by examiner

*Primary Examiner* — Thomas Denion
*Assistant Examiner* — Audrey K Bradley
(74) *Attorney, Agent, or Firm* — Morgan, Lewis & Bockius LLP

(57) ABSTRACT

A system for controlling urea injection quantity of a vehicle, may include an SCR device, the SCR device purifying NOx, a pump configured to supply the SCR device with a urea solution of a urea tank through a urea supply line, a dosing injector disposed on the exhaust pipe at upstream side of the SCR device and injecting the urea solution, and a control portion that closes the dosing injector not to exhaust the urea solution that is charged in the urea supply line if operation of the engine is stopped and outside temperature is higher than a predetermined base temperature, and that stops the pump and opens the dosing injector to exhaust the urea solution charged in the urea supply line to the urea tank if operation of the engine is stopped and the outside temperature is equal to or lower than the predetermined base temperature.

18 Claims, 3 Drawing Sheets

SYSTEM FOR CONTROLLING UREA INJECTION QUANTITY OF VEHICLE AND METHOD THEREOF

CROSS-REFERENCE TO RELATED APPLICATION

The present application claims priority to Korean Patent Application Number 10-2008-0077581 filed in the Korean Intellectual Property Office on Aug. 7, 2008, the entire contents of which are incorporated herein for all purposes by this reference.

BACKGROUND OF THE INVENTION

1. Field of the Invention

The present invention relates to a selective catalytic reduction (SCR) device that is mounted in a vehicle, and more particularly to a system for controlling urea injection in the vehicle and a method thereof

2. Description of Related Art

A variety of post-processing devices are mounted in vehicles so as to eliminates harmful materials such as NOx, CO, THC, soot, particulate matter (PM), and so on that are included in exhaust gas so as to correspond to regulations for a North America diesel Tier2/BiN5 or regulations for EURO 6.

The post-processing devices includes a diesel oxidation catalyst (DOC) that is disposed at a downstream side of an engine, a catalyzed particulate filter (CPF) that filters particulate matter (PM), and an SCR device that reduces NOx through a reduction reaction.

The selective catalyst reduction system uses ammonia ($NH_3$) as a reducing agent so as to purify NOx that is exhausted out of a diesel vehicle in a large quantity. The ammonia has good selectiveness to the NOx, and even though oxygen exists, the ammonia reacts with well the NOx.

A chemical reaction of the NOx with ammonia ($NH_3$) is as follows:

    Reaction Formula 1

A dosing injector injects a urea solution so as to purify the NOx through the SCR device, and the $NH_3$ that is generated from the injected urea solution eliminates the NOx.

A mixer is disposed between the dosing injector and the SCR device, and it mixes the urea particles that are injected through the dosing injector and guides the flow direction of the urea particles.

Accordingly, the urea particles are uniformly mixed with the exhaust gas and the purification efficiency of the SCR device is improved.

In an urea injection control method that is applied in a conventional vehicle, if ignition-on before starting an engine is detected, a pump that is disposed inside a urea tank is operated to supply the dosing injector with the urea solution at a uniform pressure of about 5 bar and the dosing injector injects the urea solution.

The set position of an ignition key includes an "ignition-off" state, an "ignition-on" state, and a "starting state" that respectively correspond to the rotation position of the ignition key.

In this specification, an "engine-on" state designates that the engine is operating and an "engine-off" state designates that the engine is not running.

More specifically, the ignition-on state of the ignition key includes one state in which the engine is operating and another state in which the engine is not operating.

When the ignition key is rotated from the ignition-on (engine-off state) to the starting state, a starter motor operates to start the engine and then if the engine is started, a driver of the vehicle returns the ignition key from the starting state to the ignition-on state (engine-on state).

Also, if the ignition key is rotated from the ignition-on of the engine-on state to the ignition-off state, the engine stops operating to have the engine-off state.

If the ignition key is positioned to ignition-off by the driver during the operation of the engine, a reverting valve that is disposed at the pump is operated in order to prevent freezing and bursting of the urea supply line.

Accordingly, the urea solution is not supplied to the urea supply line from the pump and simultaneously the dosing injector is opened to inject the urea solution of the supply line into an exhaust pipe.

However, when the urea solution is injected into the exhaust pipe during the engine-off state in which the engine is not operating as stated above, solid urea crystals are repeatedly formed at a downstream side of the exhaust pipe as shown in FIG. 3 and FIG. 4.

The attached urea crystals can be eliminated at a temperature of higher than 600° C. that is achieved when the catalyzed particulate filter is regenerated and in a condition in which the flux of the exhaust gas is high, but the urea crystals are not substantially eliminated under normal driving conditions.

In addition, when the attached urea crystals are detached, the $NH_3$ can be excessively discharged to the outside and thereby the quality of the exhaust gas can be deteriorated.

Particularly, the urea crystals that are attached on a guide fin of the mixer transform the shape thereof such that the performance of the mixer and the purification efficiency of the NOx are deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a system for controlling urea injection quantity of a vehicle and a method thereof having advantages of controlling the injection amount of urea solution so as to prevent solid urea crystals from being formed in an exhaust pipe when an engine is in an ignition-on state or an ignition-off state and there is no flux of the exhaust gas.

In an aspect of the present invention, a system for controlling urea injection quantity of a vehicle, may include an SCR (selective catalytic reduction) device connected to an exhaust pipe of an engine, the SCR device purifying NOx included in exhaust gas of the engine by using a reduction reaction between $NH_3$ and the NOx, a pump configured to supply the SCR device with a urea solution of a urea tank through a urea supply line, a dosing injector disposed on the exhaust pipe at upstream side of the SCR device and injecting the urea solution to the exhaust pipe, wherein the urea supply line connects the pump and the dosing injector, and a control portion that closes the dosing injector not to exhaust the urea solution that is charged in the urea supply line in case that operation of the engine is stopped and outside temperature is higher than a predetermined base temperature, and that stops the pump and opens the dosing injector to exhaust the urea solution charged in the urea supply line to the urea tank in case that operation of the engine is stopped and the outside temperature is equal to or lower than the predetermined base temperature.

A pressure sensor may be disposed on the urea supply line and signals a current pressure of the urea solution therein to the control portion.

The dosing injector may be disposed higher than the urea supply line so as to exhaust the urea solution charged in the urea supply line by gravity to the urea tank when the dosing injector is opened.

The predetermined base temperature may be set to be equal to or higher than freezing point of the urea solution that is charged in the urea supply line.

The predetermined base temperature may be set to at least one temperature value ranging from approximately 0° C. to approximately −5° C.

If the outside temperature is higher than the predetermined base temperature, the dosing injector may be closed not to inject the urea solution in a condition in which an ignition key is in an ignition-on state for restarting the engine.

The control portion may open the dosing injector for a predetermined time period so as to exhaust the urea solution in the urea supply line if the engine stops operating and the outside temperature is equal to or lower than the predetermined base temperature.

The control portion may open the dosing injector until line pressure in the urea supply line becomes equal to or lower than a predetermined line pressure so as to exhaust the urea solution in the urea supply line if the engine stops operating and the outside temperature is equal to or lower than the predetermined base temperature.

The control portion controlling the dosing injector by PWM signals may make control duty of the dosing injector be 0% so as to close the dosing injector if the engine stops operating and the outside temperature is higher than the predetermined base temperature.

The control portion controlling the dosing injector by PWM signals may make control duty of the dosing injector be 0% so as to close the dosing injector if the engine stops operating, the ignition-on state of an ignition key is detected before restarting the engine, and the outside temperature is higher than the predetermined base temperature.

The control portion controlling the dosing injector by PWM signals may make control duty of the dosing injector be 0% so as to open the dosing injector for a predetermined time period if the engine stops operating and the outside temperature is equal to or lower than the predetermined base temperature.

The control portion controlling the dosing injector by PWM signals may make control duty of the dosing injector be 0% so as to open the dosing injector until line pressure in the urea supply line becomes equal to or lower than a predetermined line pressure if the engine stops operating and the outside temperature is equal to or lower than the predetermined base temperature.

In another aspect of the present invention, a method for controlling urea injection quantity of a vehicle, may include a) comparing an outside temperature with a predetermined base temperature when an engine stops operating, b) sustaining a pressure of a urea solution that is charged in a urea supply line by closing a dosing injector when the outside temperature is higher than the predetermined base temperature, and c) storing a final control data of the dosing injector and applying the final control data when an ignition key for the engine is on an ignition on state to be restarted.

The method for controlling urea injection quantity of a vehicle may further include after step a), closing the dosing injector until the engine operates, when the ignition key is in an ignition-on state for restarting the engine, after the engine stops operating in a condition in which the outside temperature is higher than the predetermined base temperature.

The method for controlling urea injection quantity of a vehicle may further include opening the dosing injector for a predetermined time period so as to exhaust the urea solution in the urea supply line if the engine stops operating and the outside temperature is equal to or lower than the predetermined base temperature.

The method for controlling urea injection quantity of a vehicle may further include opening the dosing injector until line pressure in the urea supply line becomes equal to or lower than a predetermined line pressure so as to exhaust the urea solution in the urea supply line to if when the engine stops operating and the outside temperature is equal to or lower than the predetermined base temperature.

The predetermined base temperature may be set to be equal to or higher than freezing point of the urea solution that is charged in the urea supply line.

The predetermined base temperature may be set to at least one temperature value ranging from approximately 0° C. to approximately −5° C.

The methods and appartuses of the present invention have other features and advanatages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

Figure 1:
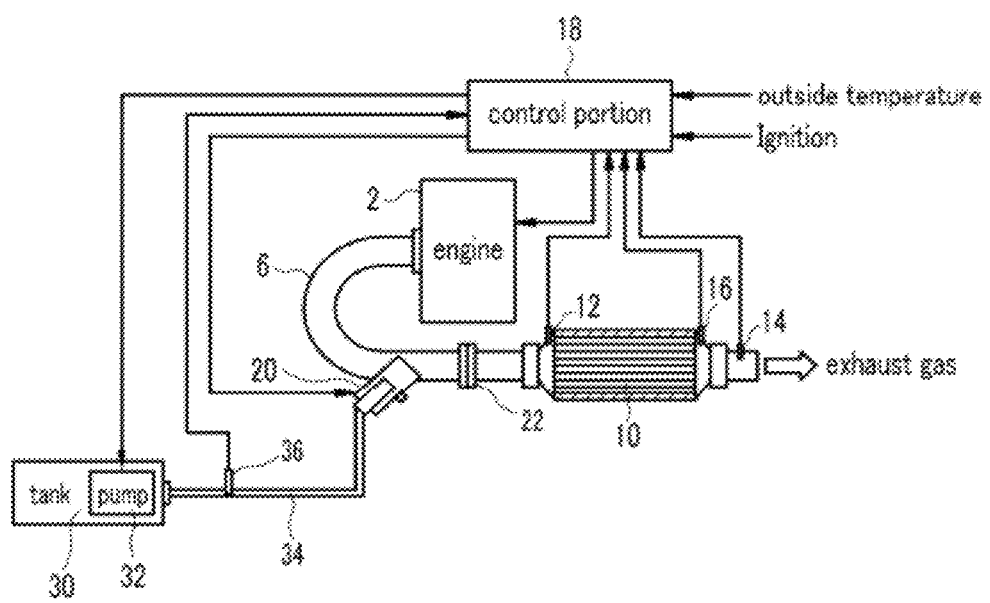
FIG. 1 is a schematic diagram of an exemplary apparatus for controlling a urea injection amount according to the present invention.

FIG. 1 is a schematic diagram of an apparatus for controlling a urea injection amount according to an exemplary embodiment of the present invention.

The present invention includes an engine 2, an exhaust pipe 6 that discharges exhaust gas, an SCR device 10, a first NOx sensor 12, a second NOx sensor 14, a temperature sensor 16, a control portion 18, a dosing injector 20, a mixer 22, a urea tank 30, a pump 32, a urea supply line 34, and a pressure sensor 36.

The SCR device 10 is disposed at one portion of the exhaust pipe 6 that is connected to the engine 2, and includes V2O5/TiO2, Pt/Al2O3, or Zeolite therein.

Also, the SCR device 10 purifies the NOx through a reduction reaction between the NOx and NH3 that is formed from the urea that is injected through the dosing injector 20.

The first NOx sensor 12 is disposed at an inlet portion of the SCR device 10, detects the NOx amount that is included in the exhaust gas, and transfers the detected information to the control portion 18.

The second NOx sensor 14 is disposed at an outlet portion of the SCR device 10, detects the NOx amount that is included in the exhaust gas, and transfers the detected information to the control portion 18.

The temperature sensor 16 is disposed at an outlet portion of the SCR device 10, detects the temperature of the SCR device 10 that is activated by the heat of the exhaust gas and transfers the related information to the control portion 18.

The control portion 18 analyzes driving conditions of the engine, outside temperature, NOx information that the first and second NOx sensors 12 and 14 detect, and the exhaust gas temperature signal of the temperature sensor 16 to calculate the NOx purification efficiency of the SCR device 10.

Furthers the control portion 18 calculates the NH3 amount that the SCR device 10 needs, determines the injection amount of the urea solution corresponding to the required NH3 amount, and controls the dosing injector 20 for injecting the urea solution.

If an ignition key is rotated from ignition-on during operation of the engine to ignition-off, the engine stops operating and the control portion 18 determines whether the outside temperature is higher than a predetermined base temperature or not.

If the outside temperature is higher than the predetermined base temperature, the dosing injector 20 is closed to not inject the urea solution.

That is, the control duty that is transferred to the dosing injector 20 is set to 0% such that the pressure of the urea supply line 34 is not released.

Further, when the ignition key is set to ignition-off during operation of the engine, the control portion 18 detects the control data of the dosing injector 20 and the control data is used to respectively control the pump 32 and the dosing injector 20 when restarting the engine.

More specifically, if the outside temperature is equal to or lower than the predetermined base temperature during the engine-off state, the dosing injector 20 is opened to release the pressure inside the urea supply line 34 during the engine-off state so that air can flow into the urea supply line 34 and prevent the urea in the urea supply line 34 from freezing. For this purpose, in an exemplary embodiment of the present invention, the urea supply line 34 may be disposed lower than the dosing injector 20 so that the urea solution is exhausted by gravity to the urea tank 30 when the dosing injector 20 is opened.

In addition, the pump is operated and the dosing injector 20 is opened so as to vent the air during the ignition-on state in which the engine does not operate such that the urea solution is injected to the dosing injector 20 in a state in which there is no flow of the exhaust gas.

However, if the outside temperature is higher than the predetermined base temperature, the dosing injector 20 is not opened when the engine is turned off. In this configuration, when the engine is set to the ignition-on state from the ignition-off state and when the engine does not run, the pump 32 is not operated and the dosing injector 20 is not opened until the engine is restarted.

Accordingly, when the engine is restarted, the ammonia (NH3) is not excessively generated and the solid matter of the urea is not formed inside the exhaust pipe 6 or on the mixer 22.

The mixer 22 is disposed between the dosing injector 20 and the SCR device 10 and disperses the urea solution injected from the dosing injector 20.

The exhaust gas mixes with the urea particles through such process, and the NH3 that is formed from the injected urea and the NOx that is included in the exhaust gas are uniformly mixed with each other.

The urea solution to be injected is charged in the urea tank 30 and the pump 32 that is disposed in the urea tank 30 is operated to supply the urea solution.

When the engine is started, the dosing injector 20 is opened to be operated, and the pump 32 pressurizes the urea supply line 34 at a predetermined pressure such that the dosing injector 20 injects the urea solution at an upstream side of the SCR device 10 according to PWM signals.

The pressure sensor 36 detects the value of the pressure that is formed in the urea supply line 34, and transfers the detected information to the control portion 18 so as to sustain the predetermined pressure in the engine-on state in which the engine 2 is operating.

The operations of the present invention that include functions that are stated above are as follows.

The control portion 18 analyzes the driving condition of the engine, the outside temperature, the signals of the first and second NOx sensors 12 and 14, the signal of the temperature sensor 16, and the NOx purification efficiency of the SCR device 10, and calculates the NH3 amount that the SCR device 10 needs.

The control portion 18 determines the necessary injection amount of the urea solution corresponding to the NH3 amount and injects the urea solution through the dosing injector 20.

The above functions are known to those skilled in the art and detailed description thereof will be omitted.

Figure 2:
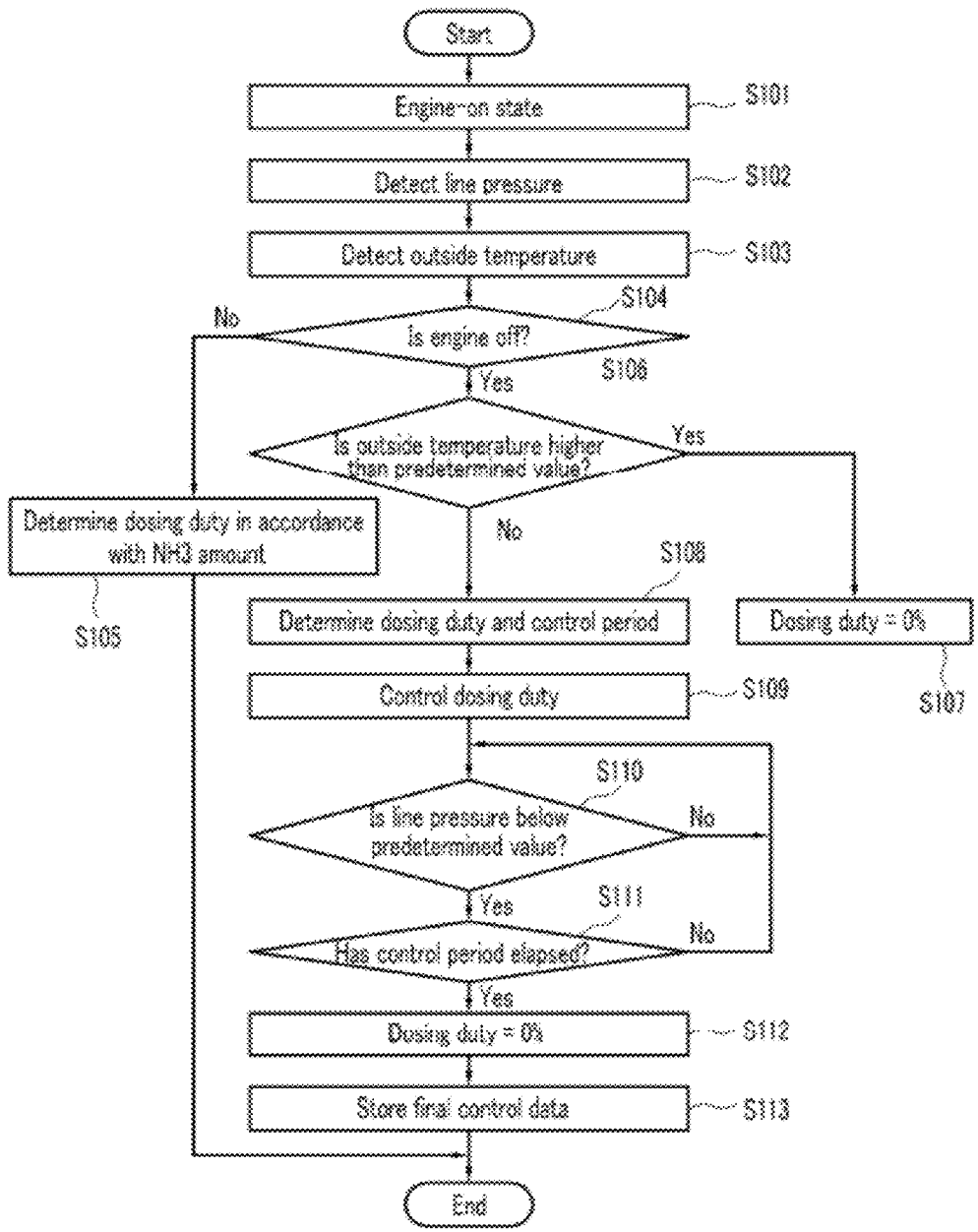
FIG. 2 is a flowchart for controlling a urea injection amount in a vehicle according to an exemplary embodiment of the present invention.
Figure 3:
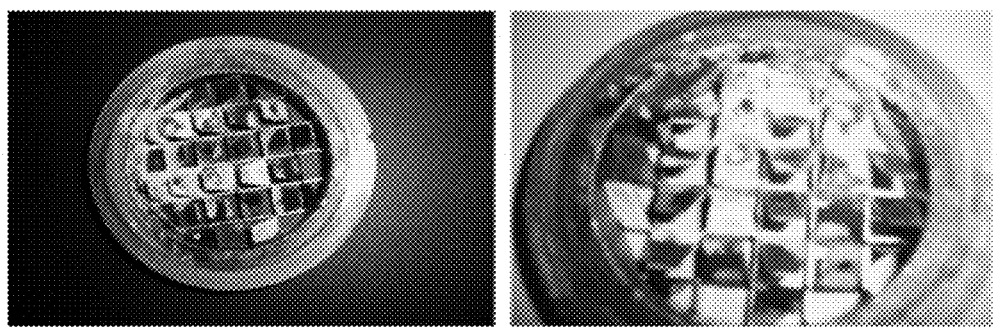
FIG. 3 and FIG. 4 show a formed condition of urea crystals with conventional control of urea injection.
Figure 4:
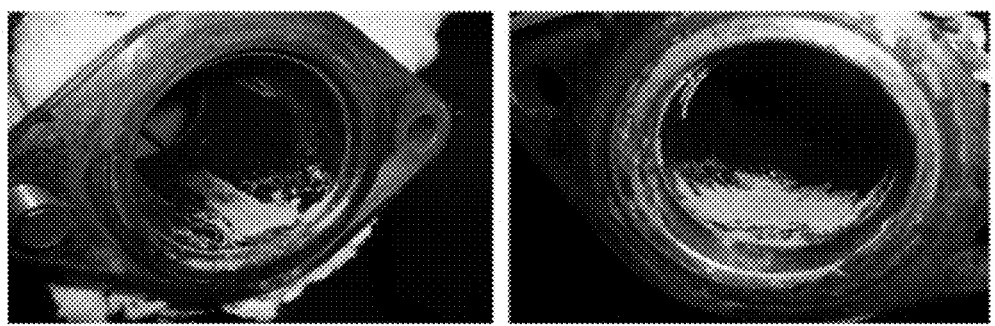

FIG. 2 is a flowchart for controlling a urea injection amount in a vehicle according to an exemplary embodiment of the present invention.

The control portion 18 detects the pressure of the urea supply line 34 through the pressure sensor 36 during the engine-on state during which the engine 2 is operating (S101), and controls the pump 32 that is disposed inside the urea tank 30 according to the detected pressure information (S102) so as to sustain the predetermined pressure at the urea supply line 34 and the dosing injector 20.

Also, the control portion 18 detects the outside temperature of the region where the vehicle is running through an outside temperature sensor or through an intake air temperature sensor (S103).

Then, the control portion 18 analyzes the operating state of the engine and also the engine-on/off state (S104), then if the engine 2 is in the ignition-on state during which the engine is operating, a dosing duty is set to inject the urea solution through the dosing injector 20 according to the calculated required injection amount of the NH3 that passes the SCR device 10 (S105).

That is, when the required NH3 amount is large, the control portion increases the dosing duty to increase the urea amount that is injected through the dosing injector 20, and when the required NH3 amount is small, the control portion decreases the dosing duty to decrease the urea amount that is injected through the dosing injector 20.

However, when the engine stops operating, that is, when the engine enters an engine-off state, the control portion determines whether the detected outside temperature is higher than the predetermined base temperature (S106).

For example, the predetermined base temperature can be set to a temperature at which the urea solution does not freeze.

The freezing point of the urea solution is −7° C., and herein the predetermined base temperature is set to a temperature that is higher than −7° C. More specifically, the predetermined base temperature can be set to at least one temperature point in a range from −5° C. to 0° C.

If the outside temperature is higher than the predetermined base temperature when the engine 2 stops operating, it is determined that the urea solution will not freeze and that the urea supply line 34 will not freeze and burst (S106), and the control duty is set to "0%" mso as to close the dosing injector 20 (S107).

Accordingly, the urea solution that is charged in the urea supply line 34 is not injected into the exhaust pipe 6 while the engine is in off-state.

However, if the outside temperature is equal to or lower than the predetermined base temperature, that is, if it is determined that the urea solution can freeze (S106), the dosing duty and the control period for exhausting the urea solution that is charged in the fuel supply line 34 is determined (S108).

Next, the pump 32 stops operating and the dosing injector 20 is controlled to be open by the duty signal so that the internal pressure of the urea supply line 34 is released and the urea solution contained in the urea supply line 34 is exhausted into the urea tank 30 by gravity so that the urea supply line 34 is filled with air (S109). Accordingly the urea supply line 34 does not freeze and burst.

In a state during which the above operations are proceeding, it is determined that the pressure of the urea supply line 34 that is detected through the pressure sensor 36 becomes equal to or lower than a predetermined base pressure and it is detected that the predetermined time period has elapsed (S110 and S111).

If the above two conditions are satisfied, it is determined that the exhaust of the urea solution is completed, and the dosing duty that is transferred to the dosing injector 20 is set to "0%" mso as to close the dosing injector 20 (S112).

Further, the control portion 18 stores the control data that is finally carried and applies the control date at the next ignition-on state during which the engine is not running (S113).

Accordingly, if the engine 2 stops operating to have the engine-off state when the outside temperature is higher than the predetermined base temperature, the predetermined pressure is sustained in the urea supply line and air does not flow into the urea supply line such that it is not necessary to vent air through the dosing injector 20 in the ignition-on state for restarting the engine.

That is, the dosing duty is controlled to "0%" mso as to close the dosing injector 20 such that the urea solution is not injected into the exhaust pipe 6 in the ignition-on state for restarting the engine.

That is, it is not necessary to release the pressure of the urea supply line 34 in a normal room temperature condition, but it is necessary to exhaust the urea solution of the urea supply line 34 at a cool temperature under or about −7° C.

And, in various embodiments of the present invention, the control result that is finally executed is stored and the control result is applied to the ignition on-state for restarting the engine 2 (S113).

That is, when the urea solution is exhausted so as to release the urea supply line 34 after the ignition is turned off, it is desirable to vent the air in the urea supply line for a predetermined time period through the dosing injector 20 in the ignition-on state before the engine is restarted.

Further, when the outside temperature is higher than the predetermined base temperature at the ignition-off state, the dosing injector 20 is closed and the pressure of the urea supply line is sustained higher than the predetermined value by the pump 32 such that the air does not flow into the urea supply line. Accordingly, at the ignition-on state before the engine is restarted, the air does not enter the urea supply line 34 and the dosing injector 20 is not opened to vent the air. That is, the urea solution is not exhausted into the exhaust pipe 6 at the ignition-on state before the operation of the engine such that the solid urea crystals are not attached inside the exhaust pipe.

For convenience in explanation and accurate definition in the appended claims, the term "outside" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling urea injection quantity of a vehicle, comprising:
    an SCR (selective catalytic reduction) device connected to an exhaust pipe of an engine, the SCR device purifying NOx included in exhaust gas of the engine by using a reduction reaction between $NH_3$ and the NOx;
    a pump configured to supply the SCR device with a urea solution from a urea tank through a urea supply line;
    a dosing injector disposed on the exhaust pipe at an upstream side of the SCR device and injecting the urea solution into the exhaust pipe, wherein the urea supply line connects the pump and the dosing injector; and
    a control portion that closes the dosing injector so as not to exhaust the urea solution that is charged in the urea supply line in the case that operation of the engine is stopped and an outside temperature is higher than a predetermined base temperature, and that stops the pump and opens the dosing injector so as to exhaust the urea solution charged in the urea supply line to the urea tank in the case that operation of the engine is stopped and the outside temperature is equal to or lower than the predetermined base temperature.

2. The system for controlling urea injection quantity of the vehicle of claim 1, wherein a pressure sensor is disposed on the urea supply line and signals a current pressure of the urea solution therein to the control portion.

3. The system for controlling urea injection quantity of the vehicle of claim 1, wherein the dosing injector is disposed higher than the urea supply line so as to exhaust the urea solution charged in the urea supply line by gravity to the urea tank when the dosing injector is opened.

4. The system for controlling urea injection quantity of the vehicle of claim 1, wherein, if the outside temperature is higher than the predetermined base temperature, the dosing injector is closed so as not to inject the urea solution in a condition in which an ignition key is in an ignition-on state for restarting the engine.

5. The system for controlling urea injection quantity of the vehicle of claim 1, wherein the control portion opens the dosing injector for a predetermined time period so as to exhaust the urea solution in the urea supply line if the engine stops operating and the outside temperature is equal to or lower than the predetermined base temperature.

6. The system for controlling urea injection quantity of the vehicle of claim 1, wherein the control portion opens the dosing injector until line pressure in the urea supply line becomes equal to or lower than a predetermined line pressure so as to exhaust the urea solution in the urea supply line if the engine stops operating and the outside temperature is equal to or lower than the predetermined base temperature.

7. The system for controlling urea injection quantity of the vehicle of claim 1, wherein the control portion controls the dosing injector by PWM signals and makes control duty of the dosing injector be 0% so as to close the dosing injector if the engine stops operating and the outside temperature is higher than the predetermined base temperature.

8. The system for controlling urea injection quantity of the vehicle of claim 1, wherein the control portion controls the dosing injector by PWM signals makes control duty of the dosing injector be 0% so as to close the dosing injector if the engine stops operating, the ignition-on state of an ignition key is detected before restarting the engine, and the outside temperature is higher than the predetermined base temperature.

9. The system for controlling urea injection quantity of the vehicle of claim 1, wherein the control portion controls the dosing injector by PWM signals makes control duty of the dosing injector be 0% so as to open the dosing injector for a predetermined time period if the engine stops operating and the outside temperature is equal to or lower than the predetermined base temperature.

10. The system for controlling urea injection quantity of the vehicle of claim 1, wherein the control portion controls the dosing injector by PWM signals makes control duty of the dosing injector be 0% so as to open the dosing injector until line pressure in the urea supply line becomes equal to or lower than a predetermined line pressure if the engine stops operating and the outside temperature is equal to or lower than the predetermined base temperature.

11. A passenger vehicle comprising the system for controlling urea injection quantity of the vehicle of claim 1.

12. The system for controlling urea injection quantity of the vehicle of claim 1, wherein the predetermined base temperature is set to be equal to or higher than the freezing point of the urea solution that is charged in the urea supply line.

13. The system for controlling urea injection quantity of the vehicle of claim 12, wherein the predetermined base temperature is set to at least one temperature value ranging from approximately 0° C. to approximately −5° C.

14. A method for controlling urea injection quantity of a vehicle, comprising:
   a) comparing an outside temperature with a predetermined base temperature when an engine stops operating;
   b) sustaining a pressure of a urea solution that is charged in a urea supply line by closing a dosing injector when the outside temperature is higher than the predetermined base temperature;
   c) opening the dosing injector until a line pressure in the urea supply line becomes equal to or lower than a predetermined line pressure so as to exhaust the urea solution in the urea supply line to the tank when the engine stops operating and the outside temperature is equal to or lower than the predetermined base temperature;and
   d) storing a final control data of the dosing injector and applying the final control data when an ignition key for the engine is in an ignition on state to be restarted.

15. The method for controlling urea injection quantity of the vehicle of claim 14, further comprising:
   after step a), closing the dosing injector until the engine operates, when the ignition key is in an ignition-on state for restarting the engine, after the engine stops operating in a condition in which the outside temperature is higher than the predetermined base temperature.

16. The method for controlling urea injection quantity of the vehicle of claim 14, further comprising:
   opening the dosing injector for a predetermined time period so as to exhaust the urea solution in the urea supply line if the engine stops operating and the outside temperature is equal to or lower than the predetermined base temperature.

17. The method for controlling urea injection quantity of the vehicle of claim 14, wherein the predetermined base temperature is set to be equal to or higher than the freezing point of the urea solution that is charged in the urea supply line.

18. The method for controlling urea injection quantity of the vehicle of claim 17, wherein the predetermined base temperature is set to at least one temperature value ranging from approximately 0° C. to approximately −5° C.

* * * * *